United States Patent
Sagapuram et al.

(10) Patent No.: US 10,843,274 B2
(45) Date of Patent: Nov. 24, 2020

(54) METHOD FOR CONTROLLING FLOW LOCALIZATION IN MACHINING PROCESSES

(71) Applicant: Purdue Research Foundation, West Lafayette, IN (US)

(72) Inventors: Dinakar Sagapuram, Lafayette, IN (US); Kevin Paul Trumble, West Lafayette, IN (US); Walter Dale Compton, West Lafayette, IN (US); Srinivasan Chandrasekar, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 454 days.

(21) Appl. No.: 14/802,804

(22) Filed: Jul. 17, 2015

(65) Prior Publication Data
US 2016/0018811 A1    Jan. 21, 2016

Related U.S. Application Data

(60) Provisional application No. 62/026,733, filed on Jul. 21, 2014.

(51) Int. Cl.
*B23B 1/00*    (2006.01)

(52) U.S. Cl.
CPC ............ *B23B 1/00* (2013.01); *B23C 2270/06* (2013.01)

(58) Field of Classification Search
CPC ........ G05B 19/45044; G05B 19/31376; Y10T 407/112; Y10T 407/114; Y10T 407/116;
(Continued)

(56) References Cited

U.S. PATENT DOCUMENTS

| 2,173,772 A | * | 9/1939 | Timmons | ................ B23B 27/22 29/DIG. 52 |
| 5,538,367 A | * | 7/1996 | Ashley | ................ B23B 27/1633 407/3 |

(Continued)

FOREIGN PATENT DOCUMENTS

| GB | 1447768 A | * | 9/1976 | ........... B21C 23/005 |
| GB | 1519663 A | * | 8/1978 | ........... B21C 23/005 |

(Continued)

OTHER PUBLICATIONS

L. De Chiffre; "Extrusion cutting of Brass Strips", Int. J. Mach. Tool Des. Res, vol. 23, No. 2/3, 1983; pp. 141-151.*
(Continued)

*Primary Examiner* — Ryan C Rufo
(74) *Attorney, Agent, or Firm* — Hartman Global IP Law; Gary M. Hartman; Domenica N. S. Hartman

(57) ABSTRACT

A method for controlling flow localization in machining process is disclosed. By application of a constraint of sufficient level in the deformation zone and modifying the surface boundary conditions, suppression of unsteady flow and flow instabilities is achieved. The method enhances machined component quality by ensuring a uniform deformation state on the machined surface. Machined components are produced by ensuing uniform deformation by adopting constrained-cutting process for suppressing the instabilities and unsteady flow through a pre-determined location of the constraint of the constrained machining process relative to the machining tool.

20 Claims, 11 Drawing Sheets

(58) Field of Classification Search
CPC ............. Y10T 82/2502; Y10T 82/2512; Y10T 82/2531; Y10T 82/2535; B21C 23/001; B21C 23/005
USPC .......................................................... 408/308
See application file for complete search history.

(56) References Cited

U.S. PATENT DOCUMENTS

| | | | | |
|---|---|---|---|---|
| 6,026,719 | A * | 2/2000 | Li ............................ | B23B 25/02 407/10 |
| 6,170,368 | B1 * | 1/2001 | Oles .................... | B23B 27/1674 407/115 |
| 7,617,750 | B2 * | 11/2009 | Moscoso ............... | B21C 23/001 82/1.11 |
| 2006/0243107 | A1 * | 11/2006 | Mann ........................ | B22F 9/04 82/1.11 |
| 2008/0138163 | A1 * | 6/2008 | Moscoso ............... | B21C 23/001 407/115 |
| 2014/0017113 | A1 * | 1/2014 | Chandrasekar ......... | B21C 23/00 420/402 |

FOREIGN PATENT DOCUMENTS

| | | | | |
|---|---|---|---|---|
| JP | | 10-296504 A | * 11/1998 | ............. B23B 27/04 |
| WO | WO 2008140638 A2 | | * 11/2008 | ........... B21C 23/004 |

OTHER PUBLICATIONS

JP 10-296504 (Translation) obtained at https://dossier1.j-platpat.inpit.go.jp/tri/all/odse/ODSE_GM101_Top.action (last visited Mar. 13, 2018).*

Xie et al., A Study on Shear Banding in Chip Formation of Orthogonal Machining, Int. J. Mach. Tools Manufact. vol. 36, No. 7, pp. 835-847 (1996).*

* cited by examiner

METHOD FOR CONTROLLING FLOW LOCALIZATION IN MACHINING PROCESSES

CROSS-REFERENCE TO RELATED APPLICATIONS

The present U.S. patent application is related to and claims the priority benefit of U.S. Provisional Patent Application Ser. No. 62/026,733, filed Jul. 21, 2014, the contents of which are hereby incorporated by reference in their entirety into the present disclosure.

TECHNICAL FIELD

The present disclosure generally relates to methods and apparatus for machining components, especially for improving surface quality of machined components.

BACKGROUND

This section introduces aspects that may help facilitate a better understanding of the disclosure. Accordingly, these statements are to be read in this light and are not to be understood as admissions about what is or is not prior art.

Plastic deformation at small length scales on surfaces is intrinsic to machining processes, sliding, and surface deformation processing. While surface generation in these processes occurs by cumulative action of tools, the loading of a single indenter against the surface captures key aspects of the mechanics of material removal and deformation. For these reasons, it is a model system for studying flow phenomena underlying material removal.

Processes by which bulk forms can be produced in a single continuous machining operation, as opposed to multi-stage deformation processes that involve a series of separate and discrete deformation operations or stages have been described in U.S. Pat. No. 7,617,750 B2 (Process of Producing Nanocrystalline Bodies) issued to Moscoso et al. on Nov. 17, 2009, and in U.S. Patent Publication No. US2014/0017113 A1 (U.S. patent application Ser. No. 13/977,859 by Chandrasekar et al.) published on Jan. 16, 2014 and issued as U.S. Pat. No. 9,687,895 on Jun. 27, 2017, the contents of both of which are incorporated herein by reference in their entirety. The processes described in this application utilize a constraining member during machining to control size of a chip produced during machining as well as the microstructural features (such as but not limited to grain size, texture) of the chip produced by the machining process. Those skilled in the art will learn from these publications the background necessary to appreciate several aspects of the present disclosure.

In free or conventional machining, near-surface plastic flow determines how material is separated from the workpiece (WP), as well as characteristics of the newly generated surface such as microstructure, strength and residual stress. Unique features of this flow are imposition of large strains; its unconfined nature, unlike in bulk deformation processing; and a deformation zone that is on the length scale of the grain size. It has long been recognized, more so theoretically, that the lack of flow confinement can result in plastic instabilities and non-uniqueness in flow modes. The diverse variety of chip-particles and surface patterns produced in cutting, e.g., discrete particles, segmented chips, wrinkled particle surfaces, bear testimony to this lack of confinement. The unconfined surface flow and its unique mesoscale characteristics, however, point to unsteady flows playing a critical role in triggering flow instabilities and localization, and creation of the particle morphologies and surface patterns. Thus conventional machining results in uncontrolled heterogeneity and inconsistent surface finish of the machined component, adversely affecting the mechanical properties of the machined component.

It is highly desired that the above mentioned flow instabilities be controlled in order to suppress segmented/serrated chip formation, which can lead to undesirable mechanical properties of the machined workpiece such as, but not limited to reduced fatigue resistance. There is an unmet need for methods and apparatus that greatly enhance the surface finish, microstructure homogeneity, and consistency of surface mechanical properties.

SUMMARY

A process of producing a machined component is disclosed. The process includes the steps of producing a continuous chip having a microstructure by engaging a solid body with a cutting edge of a cutting member while the solid body and the cutting edge move relative to each other. The chip in the immediate vicinity of the cutting edge is simultaneously extruded and the chip is separated from the solid body by the cutting edge to continuously plastically deform the chip and produce an extruded chip immediately downstream of the cutting edge. The extruding step is performed at least in part by a constraining member that defines an opening with the cutting edge through which the chip passes and is plastically deformed to produce the extruded chip. Further, the spacing between an edge of the cutting member and an edge of the constraining member is such that the extruded chip has a thickness that is less than or equal to the minimum thickness of a chip produced without using the constraining member. The chip has a cross-sectional shape having two orthogonal dimensions comprising a thickness dimension determined by the cutting member and the constraining member and a width dimension orthogonal to the thickness dimension, the chip having a microstructure without substantial flow localization. These process steps result in the solid body becoming a machined component exhibiting a surface with substantially lower heterogeneity in deformation and higher surface smoothness relative to surfaces of machined components produced by conventional machining.

Another process of producing a machined component is disclosed. The process includes the steps of producing a continuous chip having a microstructure by engaging a solid body with a cutting edge of a cutting member while the solid body and the cutting edge move relative to each other. The chip in the immediate vicinity of the cutting edge is simultaneously extruded and the chip is separated from the solid body by the cutting edge to continuously plastically deform the chip and produce an extruded chip immediately downstream of the cutting edge. The extruding step is performed at least in part by a constraining member that defines an opening with the cutting edge through which the chip. Further, the spacing between an edge of the cutting member and an edge of the constraining member is such that the chip thickness is less than or equal to the average thickness of a chip produced without using the constraining member. The chip has a cross-sectional shape having two orthogonal dimensions comprising a thickness dimension determined by the cutting member and the constraining member and a width dimension orthogonal to the thickness dimension, the chip having a microstructure without substantial flow localization. These process steps result in the solid body becoming a machined component exhibiting surface with substantially lower heterogeneity in deformation and higher surface smoothness relative to surfaces of machined components produced by conventional machining.

A method of avoiding substantial flow localization in a chip during a machining operation using a constraining member is disclosed. This includes conducting a machining operation without a constraining member to produce a chip from a solid body by a relative motion between a cutting tool and the solid body; and examining the chip produced to detect a substantial serrated flow pattern on the chip produced, thereby determining a minimum thickness of the chip produced. Then in a constrained machining operation, the spacing between an edge of the cutting tool and an edge of the constraining member is adjusted such that thickness of a chip produced in machining utilizing the constraining member is less than or equal to either the minimum thickness of the chip produced without using the constraining member or the average thickness of the chip produced without using the constraining member

BRIEF DESCRIPTION OF DRAWINGS

While some of the figures shown herein may have been generated from scaled drawings or from photographs that are scalable, it is understood that such relative scaling within a figure are by way of example, and are not to be construed as limiting.

DETAILED DESCRIPTION

Figure 1:
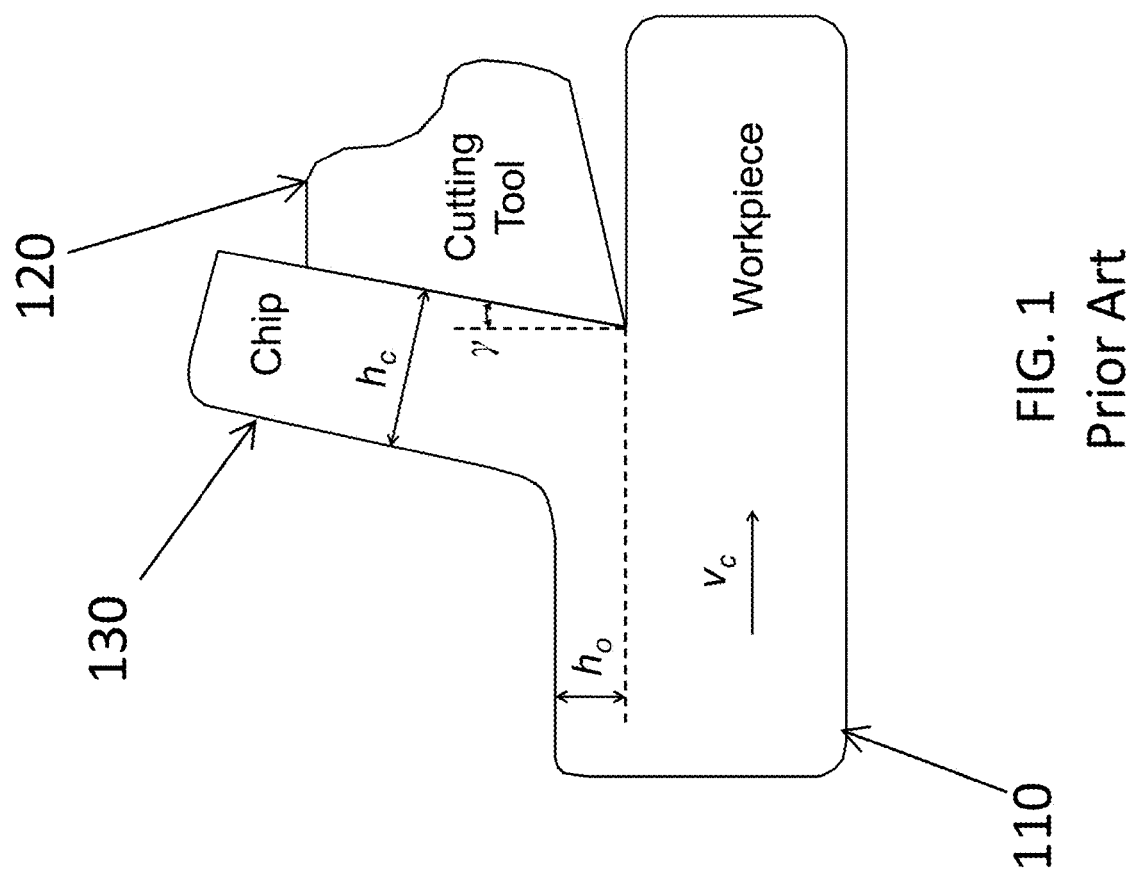
FIG. 1 is a 2-dimensional schematic representation of experimental set-up for linear cutting without using a constraint.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, such alterations and further modifications in the illustrated device, and such further applications of the principles of the disclosure as illustrated therein being contemplated as would normally occur to one skilled in the art to which the disclosure relates.

Figure 2:
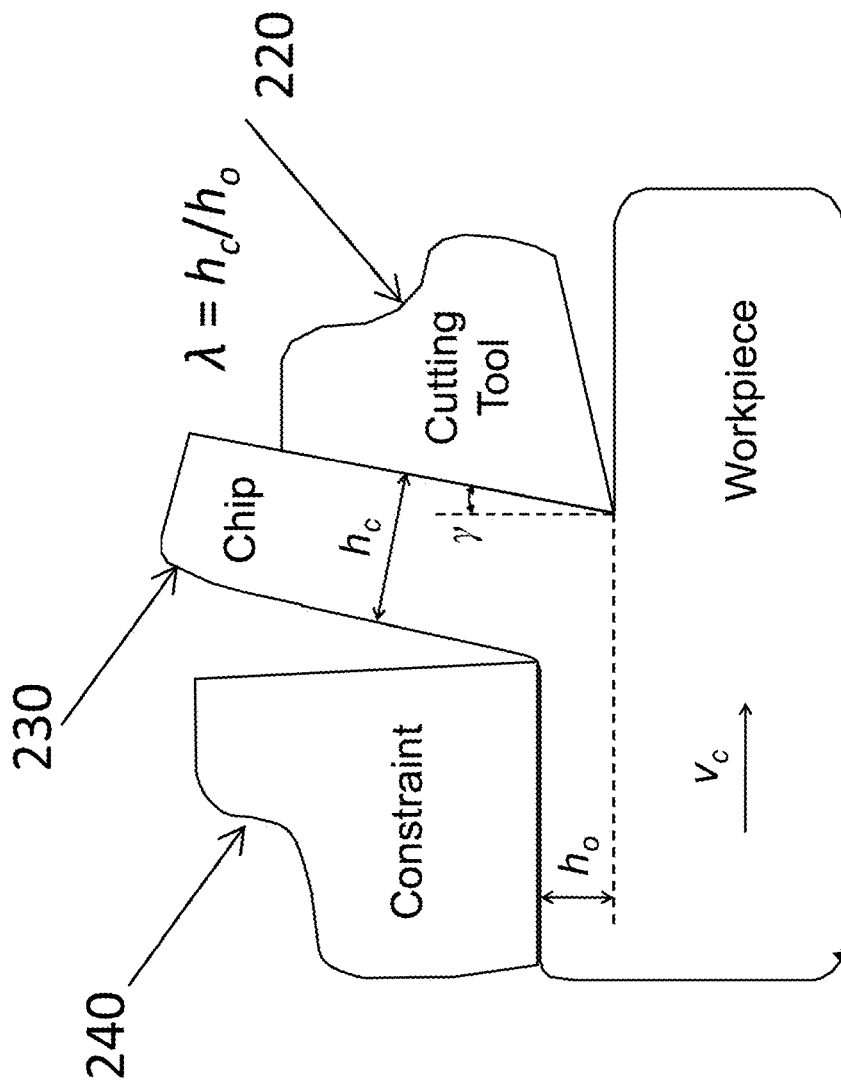
FIG. 2 is a 2-dimensional schematic representation of experimental set-up for linear cutting using a constraint.

In experiments leading to this disclosure, plane-strain cutting was carried out on linear (low-speed, high-speed steel (HSS) tool) and rotary machining (high-speed, carbide tool) setups, with tool rake angle ($\gamma$) in the range of +15° to −50°. FIG. 1 shows a 2-dimensional schematic representation of the machining set-up for linear cutting without the use of a constraint. In FIG. 1, 110 represents a workpiece to be machined, 120 represents a cutting tool, and 130 represents a chip, the result of material being separated from the workpiece. FIG. 2 shows a 2-dimensional schematic of the machining set-up for linear cutting with the use of a constraint. Referring to FIG. 2, 210 represents a workpiece to be machined, 220 represents a cutting tool, 230 represents a chip, the result of material being separated from the workpiece, and 240 represents a constraint utilized to generate the desirable machining features as described in U.S. Pat. No. 7,617,750 B2 and U.S. Patent Publication No. US2014/0017113 A1, both of which are referenced earlier and incorporated by reference herein into this disclosure in their entirety. In FIGS. 1 and 2, $h_c$ denotes final chip thickness, $h_o$ denotes undeformed chip thickness, $\gamma$ denotes the rake angle, and $v_c$ represents workpiece surface velocity (or cutting velocity). In FIG. 2, $\lambda$ is the chip thickness ratio, $h_c/h_o$. For linear cutting $h_o$ is the depth of cut, while for rotary cutting $h_o$ represents feed length per revolution.

Figure 3B:
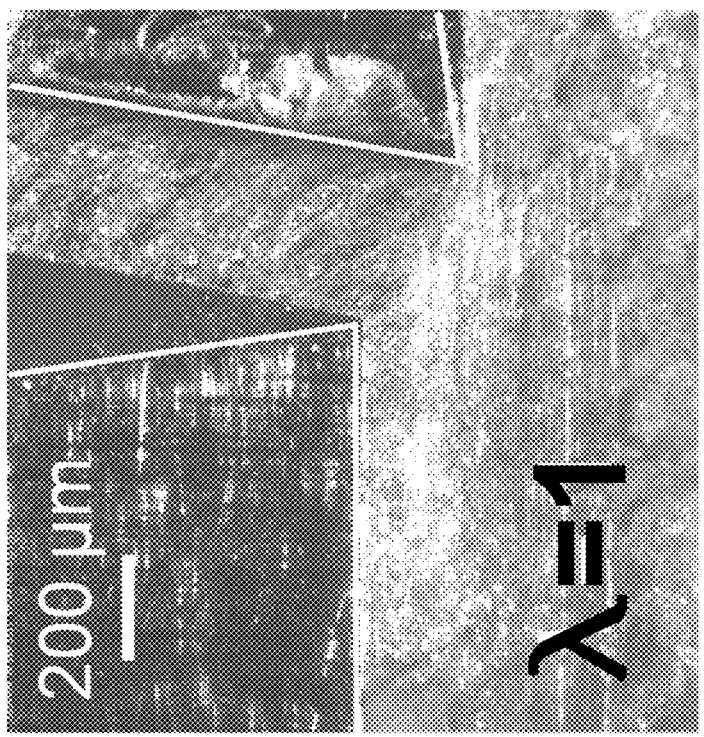
FIGS. 3(a) and 3(b) represents plastic flow pattern for the case of unconstrained machining and for the case of constrained machining, respectively.
Figure 3A:
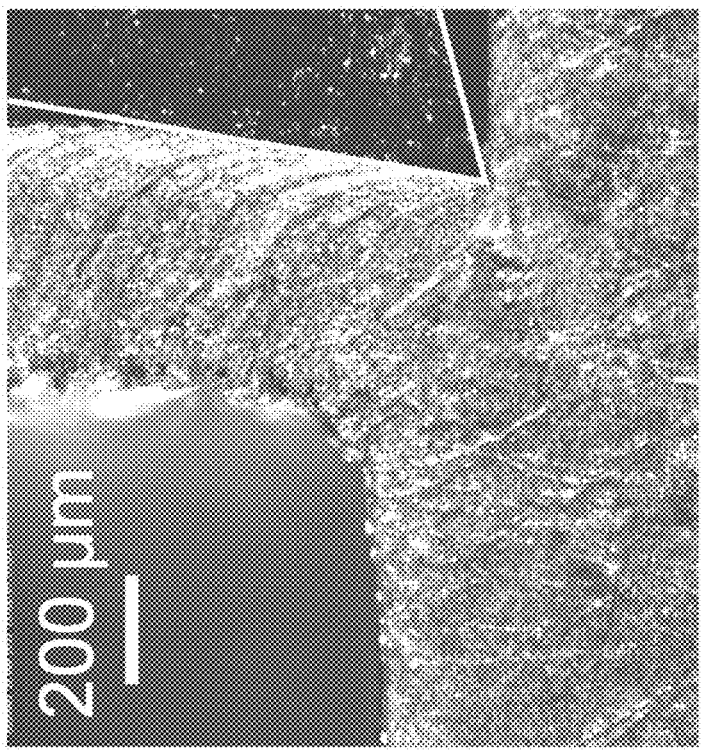

Quantitative flow parameters, e.g., strain, strain rate, streak-lines, were obtained by particle image velocimetry (PIV) analysis of images depicting unconstrained and constrained machining. A marker technique was used to analyze flow in high-speed cutting ($v_c$~0.25-5 m/s), where direct imaging is less feasible. Finely-spaced (~5 μm) parallel markers were machined onto one side of a disk workpiece (WP) prior to the cutting. This side-surface was also constrained to ensure plane-strain. The WP materials, selected to illustrate specific instabilities, were: half-hardened (H02) single-phase brass 260 and Al 1100, representing partially work-hardened metals; Mg AZ31B as a model system for poor-workability alloys; annealed OFHC Cu for highly ductile metals; and Ti-6Al-4V, representing hard metals with low thermal diffusivity. FIGS. 3(a) and 3(b) show images of the flow in conventional machining (in this case cutting) and the flow in machining (in this case cutting) with a constraint, respectively. From FIGS. 3(a) and 3(b), it can be seen that the free surface effects leading to wrinkled patterns on the chip surface are eliminated with the use of a constraint.

Figure 4:
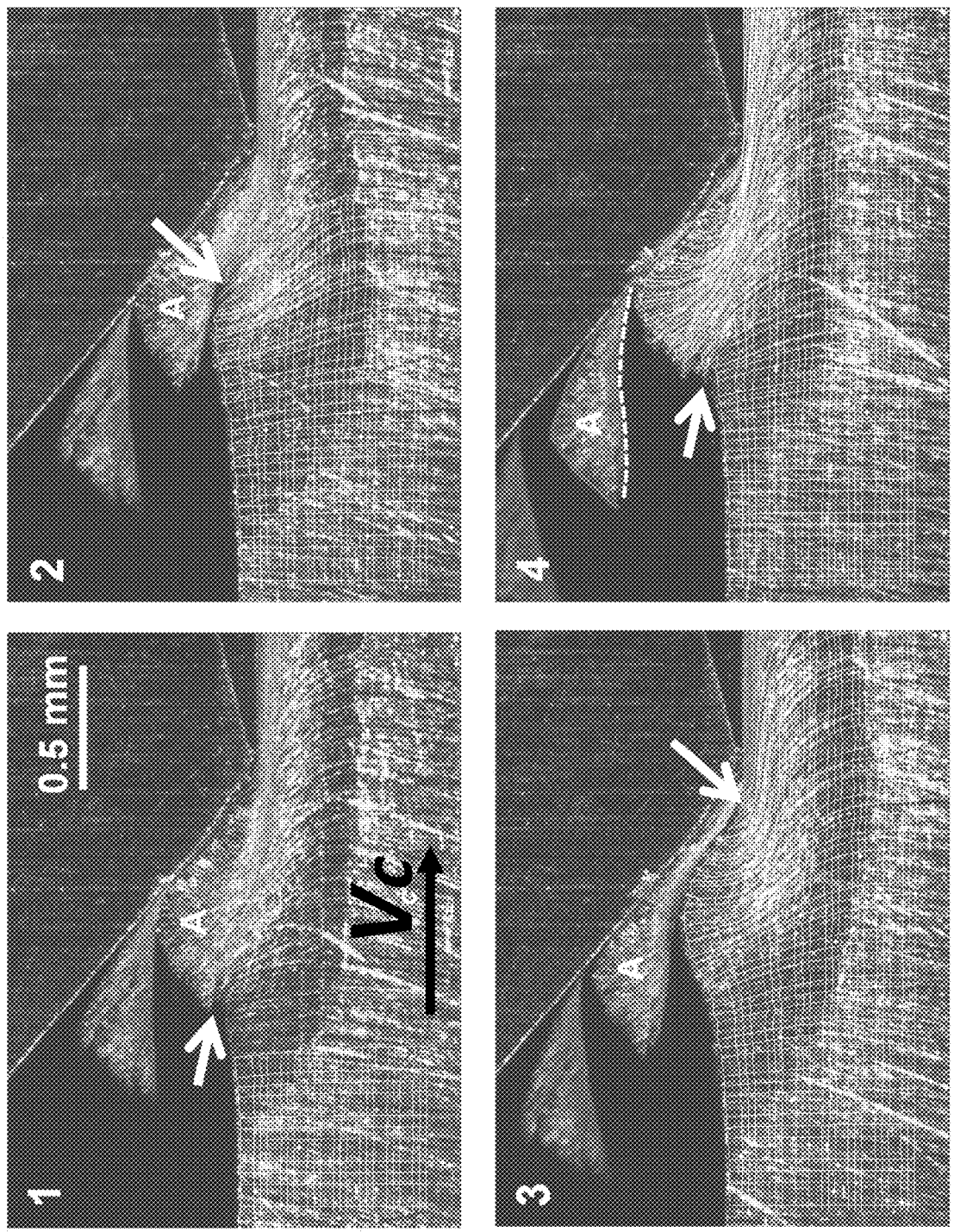
FIG. 4 shows images of flow evolution in segmented chip formation. (Brass, $\gamma=-50°$, $v_c=1$ mm/s, $h_o=50$ μm, inter-frame=0.8 s.)

FIG. 4 shows select frames of flow imaging for the case of unconstrained machining, with superimposed (virtual) grid, from a high-speed sequence of cutting of brass 260 ($\gamma=-50°$), highlighting a flow instability that triggers chip segmentation. The alpha brass had a grain size of ~15 μm, Vickers hardness ~137 kg/mm², and WP roughness Ra~0.1 μm. Referring to FIG. 4, a prow (A) of material develops ahead of the tool. But the flow is unsteady and the prow unstable, as seen in the sequence. A crack initiates on the prow surface (red arrow, frame 1), triggering a surface flow instability, and propagates towards the tool tip (frames 1-3, yellow arrow marks crack tip). When it reaches the tip, prow A is separated from the WP as a discrete chip (fully segmented, frame 3). The crack propagates at ~0.7 mm/s initially, slowing to ~0.5 mm/s as it approaches the tool. This speed is much lower than adiabatic shear failure speeds but quite similar to the cutting speed of 1 mm/s, indicating a stable growth of the crack, driven-in by the advancing tool. The propagation of the crack is in a ductile mode. Simultaneously, a new prow develops below A (frames 2-4) until it is somewhat constrained by the tool (frame 4); material flow through the prow is now quickly retarded. A crack then initiates as before at the prow surface (red arrow, frame 4) even as A is squeezed out as a chip. The next cycle of discrete chip formation now begins. This discrete chip formation was also noted in partially-hardened Cu, Al and Ti. Besides highlighting the unsteady surface flow, the observations show conclusively, that discontinuous chip formation and segmentation are due to a ductile crack originating on the free (back) surface of the chip. While the free surface failure initiation has been suggested in prior work mainly with hard (brittle) steels and Ti-6Al-4V, the present results are the first confirmation using in situ observation, including for cutting of ductile metals.

Figures 5A, 5B:
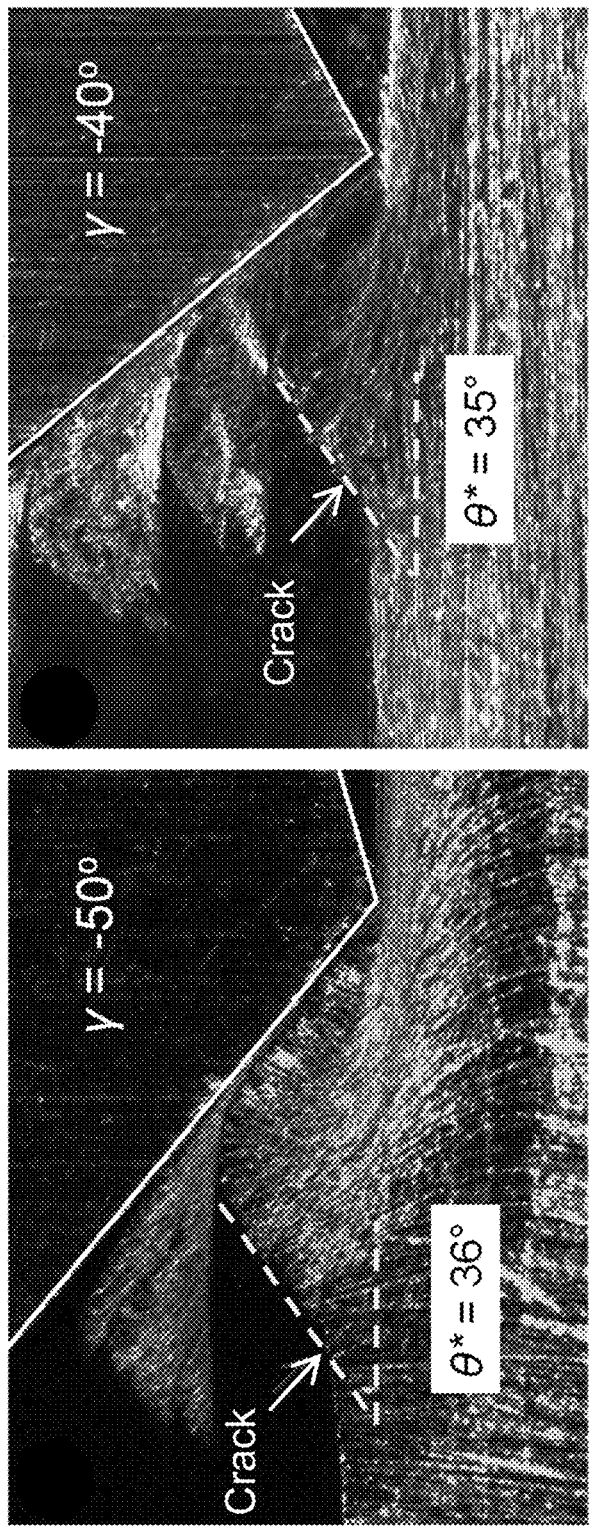
FIG. 5 is a representation of prow slope at crack initiation (arrows) in (a) brass 260 ($\gamma=-50°$, $v_c=1$ mm/s, $h_o=50$ μm) and (b) Al 1100 ($\gamma=-40°$, $v_c=5$ mm/s, $h_o=50$ μm). (Note that θ* is essentially the same for the two systems.)

When γ is made less negative, the discrete chip was found to transition to a partially segmented chip, with serrated pattern on its surface, due to the prow crack propagating only part way into the chip. At γ=0°, a continuous chip resulted but with a free surface that was still rough (~0.08 $h_c$) at the mesoscale; this roughness was due to the prow cracks being arrested very soon after initiation. The in situ observations thus showed that these chip morphologies—discrete, partially segmented and continuous with small-scale roughness—all arise from the same, universal ductile failure operating at different scales. Interestingly, the prow slope at crack initiation (θ*) was constant at ~35° and independent of γ. FIG. 5(*a*) shows a similar images for the case of a discontinuous chip while FIG. 5(*b*) shows similar mode of segmentation, with θ* of 30°-35°, was also observed with partially-hardened Cu, Al and Ti, suggesting θ* is determined primarily by the deformation geometry.

The segmentation observed in unconstrained machining also leaves its imprint on the machined surface in the form of a heterogeneous strain distribution along the cut length, due to the prow instability. The maximum strain at the surface in one experimental machining without constraint varied between 4 and 2.5. The unsteady surface flow thus can have undesirable consequences for surface quality, beyond surface finish degradation and force oscillations.

Figures 6A, 6B:
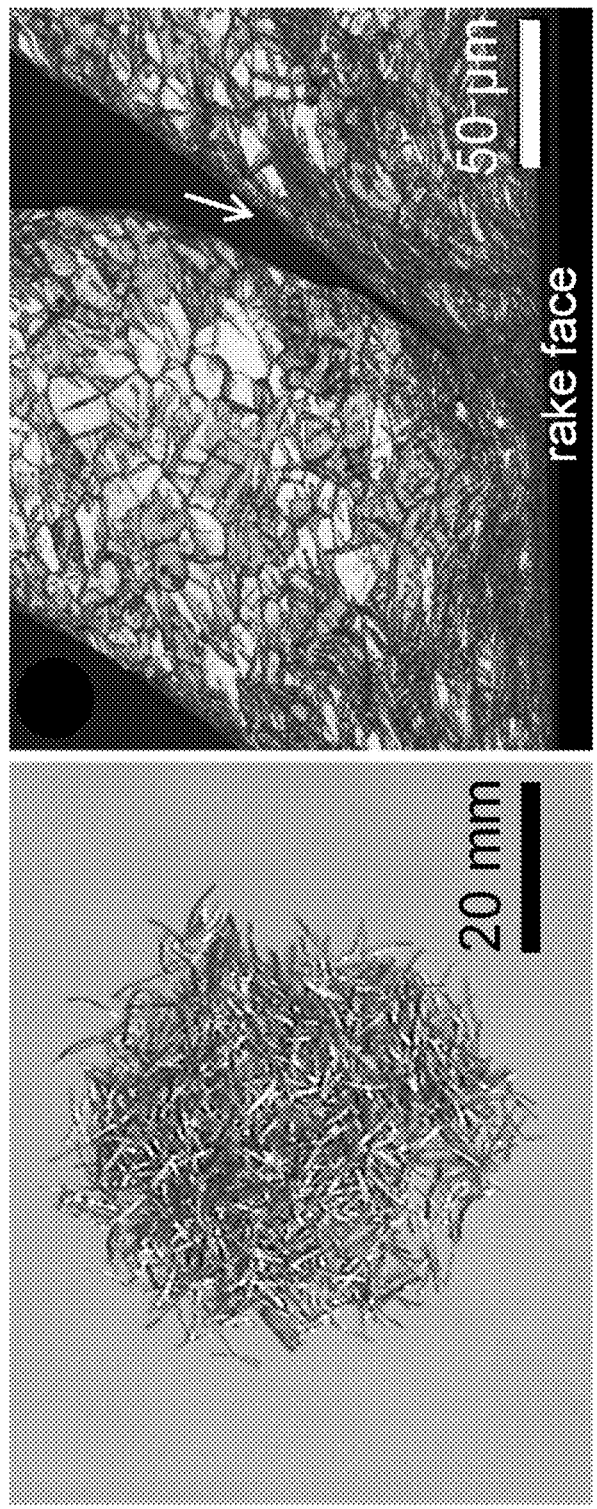
FIG. 6 shows a segmented chip in Mg AZ31B characterized by (a) discrete needle-like macrostructure, and (b) nonhomogeneous microstructure.

Segmentation is also quite pronounced in hexagonal close-packed (hcp) crystal structure metals like Mg alloys, where poor workability is due to limited slip activity at room temperature. This segmentation is reflected in a discrete chip macrostructure as shown in FIG. 6(*a*). FIG. 6(*a*) shows a segmented chip in Mg AZ31B characterized by (a) discrete needle-like macrostructure, while FIG. 6(*b*) shows highly nonhomogeneous microstructure. The rake face and chip-margin (arrow) exhibit dark etching contrast indicative of high straining; γ=5°, $v_c$=1.2 m/s, $h_o$=250 μm.

Figure 7:
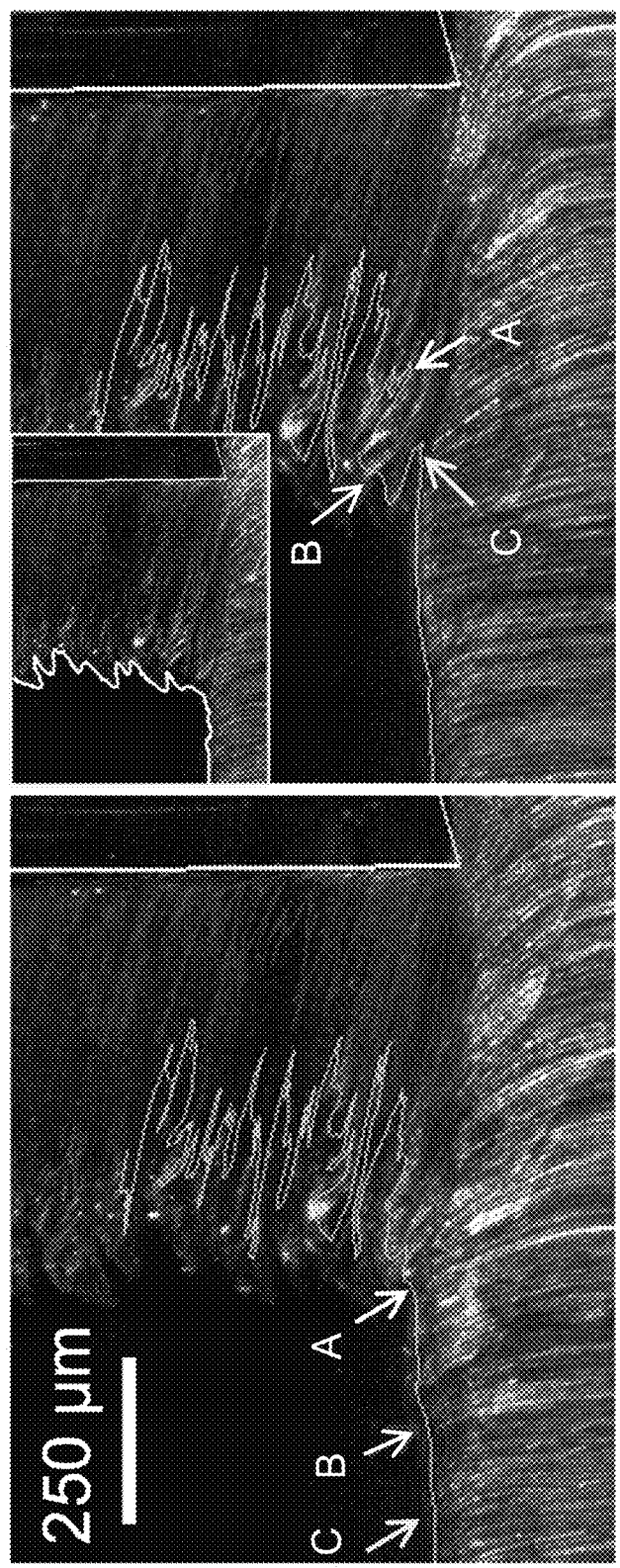
FIG. 7 shows image frames (inter-frame 0.3 sec) with streak-lines showing folding instability and highly sinuous flow in annealed Cu. (Wrinkled chip surface due to the instability is shown in inset. $\gamma=0°$, $v_c=0.4$ mm/s, $h_o=50$ μm.)

That cutting of soft annealed metals can pose difficulties has long been known in machining practice. The forces are often high and there is significant side flow of metal leading to the designation of poor machinability. The large forces have been attributed to a small shear angle. To better understand these observations, the nature of flow in cutting of annealed Cu (~500 μm grain size) was explored using high-speed imaging. FIG. 7 shows two frames, with streak-lines superimposed, depicting the flow. A streak-line is the locus of material particles that have previously passed through a particular spatial point. The flow is quite unusual characterized by highly sinuous streak-lines and significant vorticity, and folding over of the lines throughout the chip akin to "rope-coil" flow in viscous liquids. It is obvious that this flow cannot be described in the framework of the usual deformation zone models of cutting. The arrows in the figures track the same material points as the chip forms. The sinuous flow and folding appear to be triggered by small wrinkles that develop on the WP surface (see arrows, frame 1), reminiscent of a similar flow in sliding metals. We term this unsteady flow as vortex-like, and the instability, a folding instability. This flow triggers self-contacts on the chip free surface, giving the surface a highly wrinkled morphology (see inset in FIG. 7).

The reasons for the high forces and poor machinability of annealed metals are now apparent. The vortex-like flow involves extensive redundant deformation, in contrast to that envisaged in the usual cutting models. It is this vortex-like flow, rather than a small shear angle, that makes annealed metals difficult to machine. The "severity" of the vortex-like flow (and force levels) was found to decrease if the WP was strain hardened prior to the cutting. While the origin(s) of this flow is as yet unresolved, it likely involves WP microstructure heterogeneity and strain hardening capacity. As with the segmentation, the WP free surface plays a key role in this instability.

Figure 8:
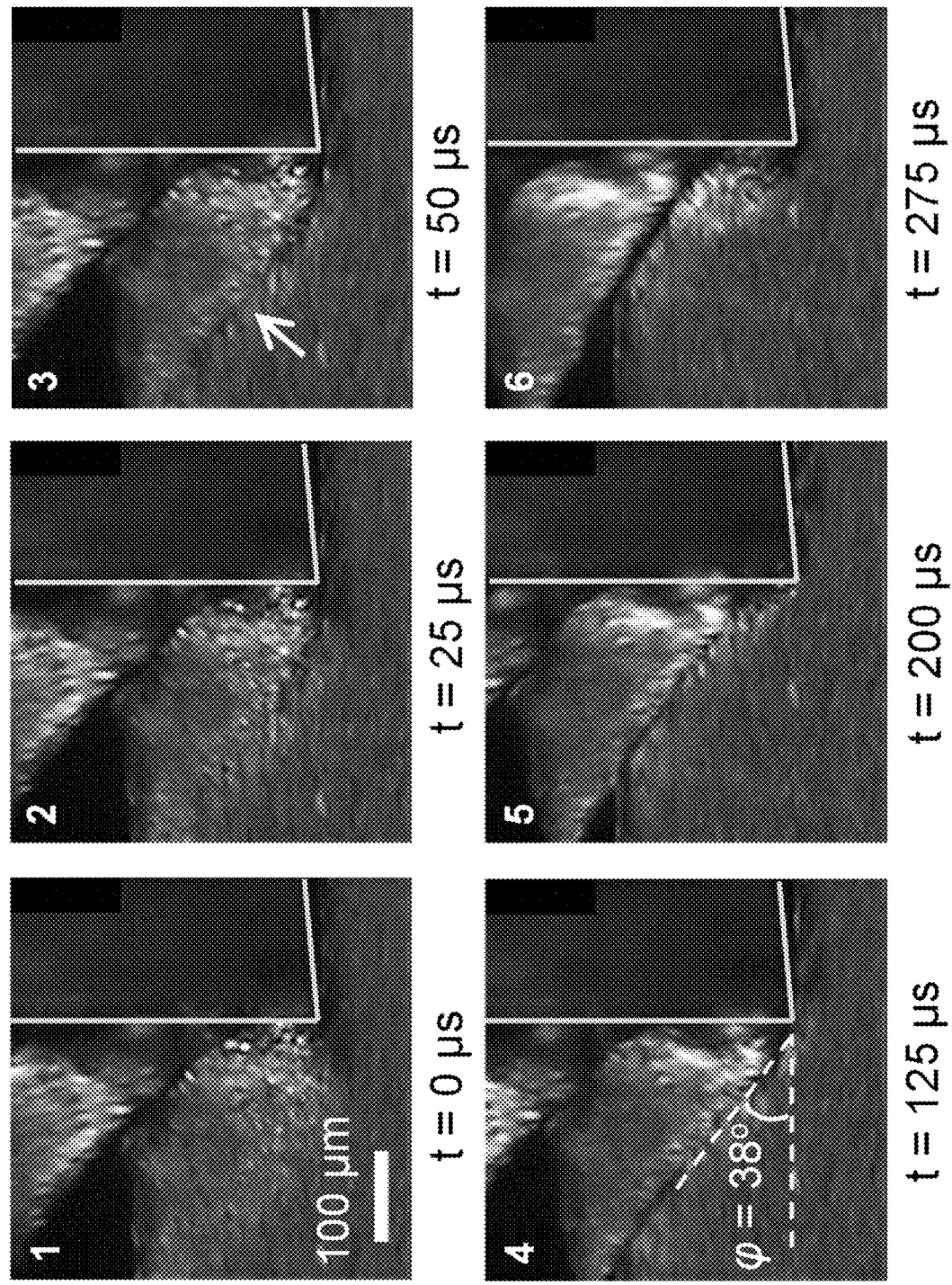
FIG. 8 shows high-speed image sequence of shear band development in Ti-6Al-4V ($\gamma=0°$, $v_c=0.65$ m/s, $h_o=200$ μm). (Frames 1-3 show initiation of a "weak path" (arrow), followed by simultaneous shear by sliding along this path in frames 4-6.)

Flow localizing by adiabatic shear is common in high-speed cutting of low-thermal diffusivity alloys such as Ti and Ni. FIG. 8 is a high-speed image sequence of this instability in Ti-6Al-4V. The Ti-6Al-4V used, in an initial mill-annealed condition, had grain size of 3 μm and hardness of 346 HV. The instability is seen to be a two-step process. The first step is creation of a planar "weak path", fully established by frame 3 in FIG. 8 (see at arrow), that precedes subsequent localized flow. The path development is rapid and occurs between frames 2 and 3, giving a lower-bound of 8 m/s for the propagation front velocity. The second step is shear along the localized band (frames 4-6), with each side of the band sliding essentially as a rigid body. This step, resembling stack-of-cards shear, reduces the load-bearing area; this will contribute to flow softening in addition to the adiabatic conditions. The sliding velocity (0.78 m/s) is close to the shear velocity ($v_s$~0.83 m/s) estimated for the stack-of-cards model, as $v_s$=cos γ/cos(φ−γ) $v_c$, with φ the shear angle (frame 4, FIG. 8).

Figure 9B:
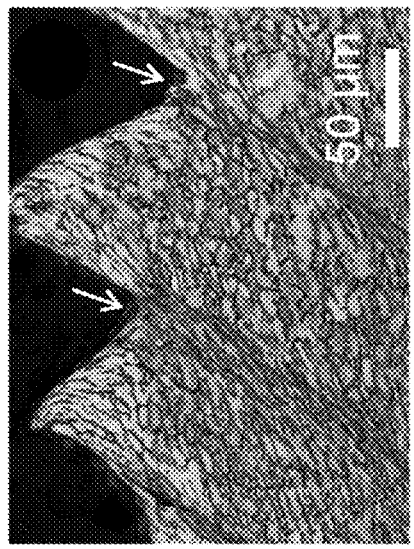
FIG. 9 shows deformation and microstructural characteristics of shear bands in Ti-6Al-4V.

The characteristics of the shear-banded chip, including displacement of specific marker lines used to compute local strain, are shown in FIG. 9. The SEM image in FIG. 9(*a*) shows displacement of specific markers (arrows) due to localized shear in a shear banded Ti-6Al-4V chip. FIG. 9(*b*) shows an optical micrograph of chip microstructure, and FIG. 9(*c*) shows the strain profile in the band vicinity; γ=0°, $v_c$=1 m/s, $h_0$=125 μm. The "saw-tooth" shape and marker displacements are due to localized flow in the bands. These shear displacements, indicated by the arrows in FIG. 9(*a*), at various points along the band length were essentially equal (~80 μm) and similar to the shear offset at the surface. This implies uniform straining in the band. The band (local) shear strain ($γ_{sb}$) is computed as the ratio of the marker displacement to band width (Δ). Measurements of Δ from at least 10 bands using optical, electron microscopy and diffraction methods yielded self-consistent results, and showed Δ to be strongly dependent on $v_c$. For $v_c=1$ m/s in FIG. 9, $\Delta$ was 3.9±0.6 µm, giving $\gamma_{sb}$ of 22.6. The corresponding local strain rate, $v_s/\Delta$, is $4\times10^5$/s, at least an order higher than in continuous chip formation. The band strain ranged from $\gamma_{sb}\sim10$ ($v_c=0.25$ m/s) to ~40 ($v_c=5$ m/s), as in dynamic punching.

Figure 9C:
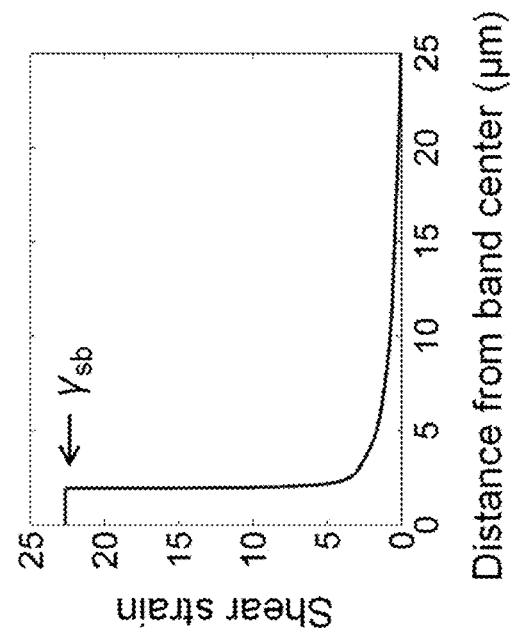
Figure 9A:
Figure 10:
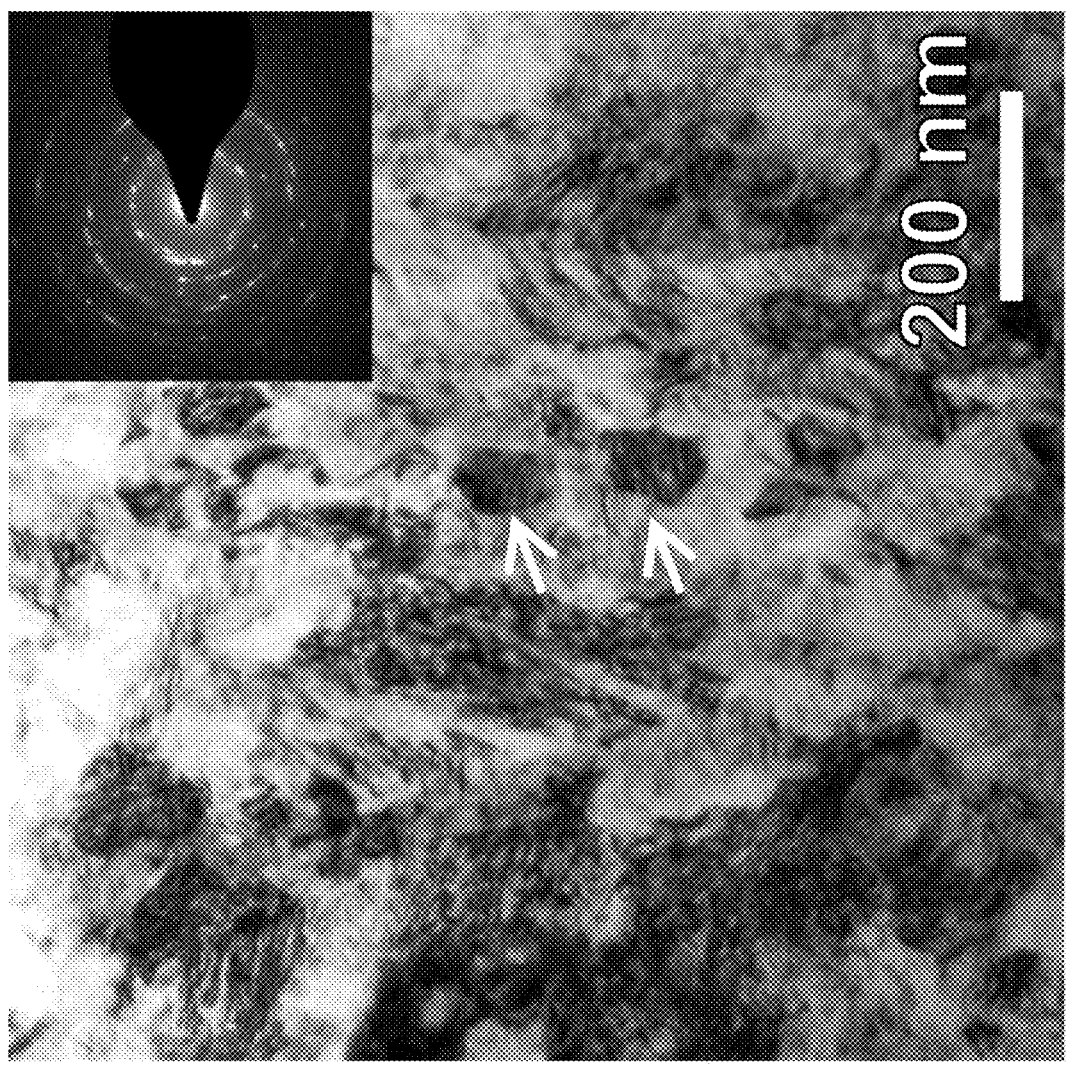
FIG. 10 is a bright-field TEM image showing nanocrystalline microstructure (~50-100 nm grains, arrows) inside the shear band. (Inset is the diffraction pattern taken from the imaged area.)

The markers, equivalent of streak-lines, are useful also for estimating the strain in the regions adjoining the bands. The white wavy line in FIG. 9(a) highlights a marker across two chip segments and a band. This streak-line is curved at the band margins, revealing deformation gradients established due to the localized shear. The strain profile, obtained from the local streak-line curvature, is shown in FIG. 9(c). The strain gradient is steep (~20/µm) in the immediate vicinity of the band (within 1 µm), followed by a gentle decay. This gradient is reflected in the microstructure shown in FIG. 9(b), with the shear-banded region (arrows) showing highly distorted structure, and the less-deformed region between the bands preserving the original grain structure. FIG. 10 is a bright-field Transmission Electron Microscopy (TEM) image showing nanocrystalline microstructure (~50-100 nm grains, arrows) inside the shear band. Inset of FIG. 10 is the diffraction pattern taken from the imaged area. This TEM image of the band showing nanoscale structures with ~50-100 nm grain size—a consequence of the extreme deformation occurring in the band.

The image analysis and related characterization has shown that shear banding is a 2-step process, with a contribution to flow softening likely also resulting from load-bearing area changes during the shear. Local deformation parameters in the band and its vicinity can be measured, enabling correlations with microstructure and strength properties. The multi-scale characterization, besides being of value for validating machining models, can also provide insights into flow localization mechanisms and dynamic flow stress in the band.

Results of experiments leading to this disclosure have thus shown that unsteady flows and various instabilities in cutting are triggered by events on the WP free surface and initial WP state (e.g., hardening capacity, microstructure). In the case of segmentation, this impetus is prow formation followed by cracking; with the folding, it is formation of small wrinkles; and with the shear banding, it is accommodation of the unconfined macroscale shear displacement that also impacts flow softening. These observations suggest that if the chip formation could be modified by application of a suitable constraint in the deformation zone (see FIG. 2), thereby converting it into (constrained) hybrid cutting-deformation, then opportunities exist for negating free surface effects and flow instabilities.

Figure 11:
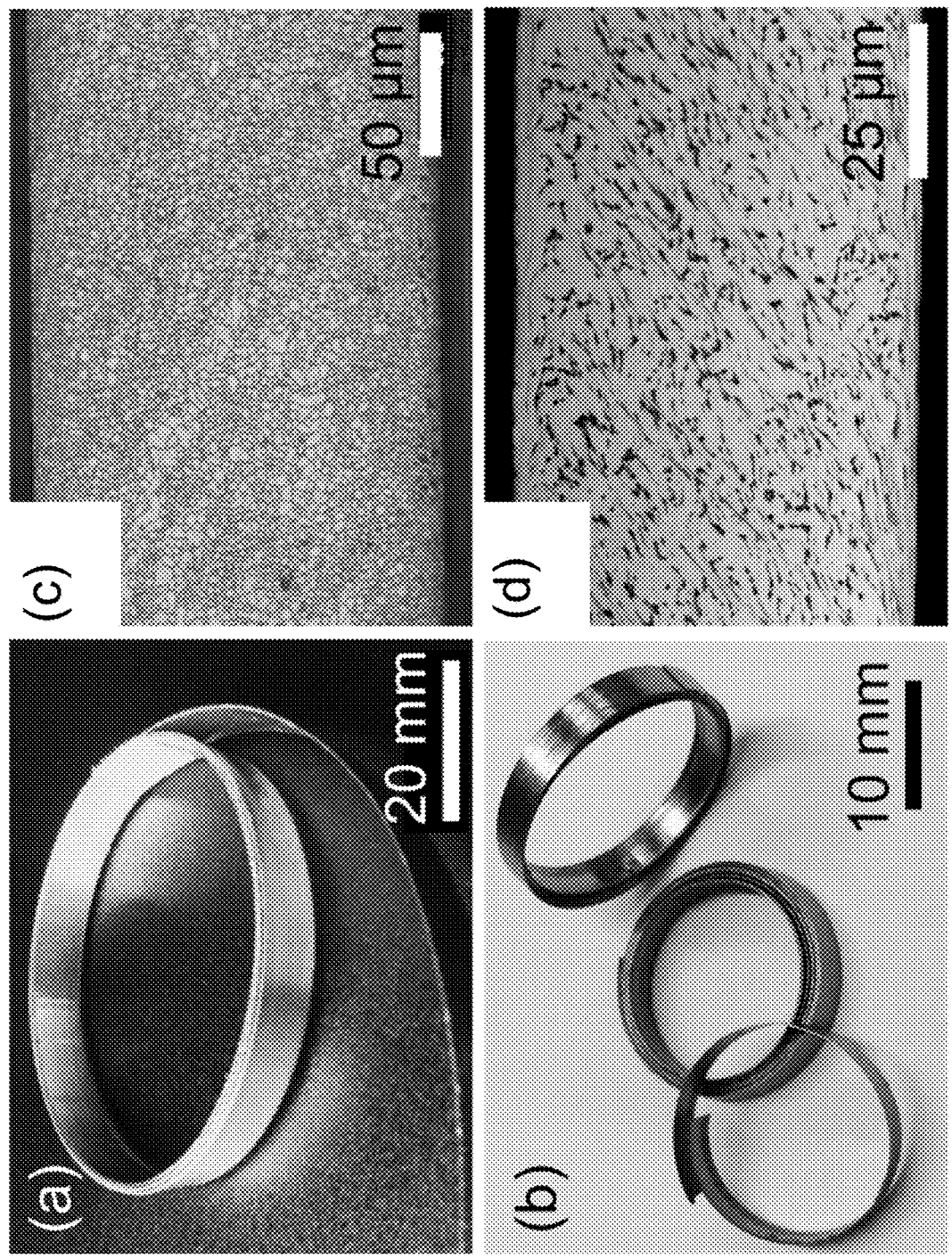
FIG. 11 shows suppression of flow instabilities by constrained cutting indicating continuous chip morphology (left) and the associated homogeneous microstructure (right) for (a) Mg AZ31B ($\lambda=0.7$, $\gamma=0°$, $v_c=1$ m/s, $h_o=250$ μm) and (b) Ti-6Al-4V ($\lambda=0.6$, $\gamma=0°$, $v_c=1$ m/s, $h_o=125$ μm).

FIGS. 11(a) and 11(b) demonstrate the successful outcome of this constrained cutting approach in controlling segmentation (Mg AZ31B) and shear banding (Ti-6Al-4V). The constraint level, set by the ratio $\lambda=t_c/h_o$, was 0.7 for Mg AZ31B and 0.6 for Ti-6Al-4V. Particular attention must be paid to the uniformity of the chip microstructure in these figures, for this is the unambiguous signature of suppression of instability. For reference, these microstructures can be contrasted with the heterogeneous microstructures shown in FIGS. 6(b) and 9(b) produced at similar cutting conditions, but without constraint. The occurrence of a continuous chip, while a necessary signature, is not a sufficient one for demonstrating lack of flow instability. The transformation of the discrete chips in conventional machining of Mg AZ31B, shown in FIG. 6(a), to a continuous foil of very long length in the constrained cutting shown in FIG. 11(a) is quite remarkable. The constrained cutting has also been successful in suppressing the vortex-like flow in annealed metals.

It must be noted that suppression of the free surface effects requires a constraint of sufficiently small $\lambda$, and not just any $\lambda$. This $\lambda$ value can be estimated a priori by assessing the surface displacements that trigger/accommodate the flow instability: with segmentation, this is related to prow height; for shear banding, by the shear offset; and in the case of the vortex-like flow, by the wrinkling. The constrained machining has another key characteristic—confinement of the plastic-work induced heating that promotes near-adiabatic conditions in the deformation zone—of extraordinary value for enhancing slip in hcp alloys, and production of metal sheet with fine-grained microstructures and shear-textures by chip formation. These observations also suggest other approaches to suppression of instabilities such as by control of the loading cycle (e.g., modulation-assisted machining), and initial WP texture.

From the above discussions it is clear that the flow characteristics in cutting of diverse metal systems show that the flow is mostly unsteady and at variance with that of the usual models of chip formation. The development of three types of flow instabilities can be noted namely segmentation, vortex-like flow with folding, and shear banding. The workpiece surface plays a major role in triggering the instabilities. By application of a constraint of sufficient level in the deformation zone and modifying the surface boundary conditions, unsteady flow and flow instabilities can be suppressed. This can enhance workpiece quality by ensuring a uniform deformation state on the machined surface.

Based on the above detailed description, we can now outline a method for suppressing flow localization in the chip and improving the surface quality of the machined component in terms of surface finish, homogeneity in deformation and microstructure. First, a machining operation is conducted without the use of a constraint to produce chip under machining conditions of interest ($v_s$, $h_o$, $\gamma$). The chip is prepared for a microscopic examination by several methods. A non-limiting example of such a method would be to collect and mount the chip in epoxy (mounting media), and polish the chip-thickness cross-section and inspect serrated (saw-tooth) chip pattern under an optical microscope to determine the maximum chip thickness ($hc_{max}$) and minimum chip thickness ($hc_{min}$). Then, the level of desired constraint ($\lambda$) can be arrived at by adjusting the spacing between the cutting tool edge and the constraint edge (this can be accomplished in several ways, for example by use of shims) so that the final chip thickness $h_c$ is $\leq hc_{min}$. The corresponding chip thickness ratio $\lambda$ will be therefore $\leq \lambda_{min}$ ($\lambda_{min}$ being the $hc_{min}/h_o$). If $\lambda > \lambda_{min}$, flow localization may not be necessarily suppressed. After setting $\lambda$, same machining conditions ($h_o$, $v_c$, $\gamma$) as were used for unconstrained machining in which chip sample was collected from which $hc_{min}$ was determined are to be used in setting up constrained machining. Through application of the constraint with the criteria for setting up the constrained machining, serrated chips can be avoided and continuous chips with smooth surfaces on both sides can be obtained. This process, as described in the disclosure, results in a machined component of high surface quality in terms of surface finish, deformation homogeneity and microstructure.

For the case of a chip exhibiting serrated flow produced by conventional machining without a constraint, we can define an average thickness of the chip $h_{avg}$ to be ($hc_{max}$+ $hc_{min}$)/2. We can then define $\lambda_{avg}$ as the ratio of average thickness of the chip $h_{avg}$ to the undeformed chip thickness $h_o$. It should be recognized that in some cases, especially in serrated flow, if λ is greater than $\lambda_{avg}$, then it is highly unlikely that flow localization is suppressed to any appreciable degree. λ values between $\lambda_{min}$ and $\lambda_{avg}$ can be capable of suppressing flow localization in the chip.

It is to be noted that the deformation homogeneity in the machined component has a direct correspondence with the level of suppression of flow localization in the chip. Thus a certain degree of suppression of flow localization is beneficial to contributing to the deformation homogeneity of the machined component.

It should be recognized that the above methodology is not limited to linear cutting or machining and is applicable to circular or rotary machining as well as other geometries of machining.

A process of producing a machined component can now be described. The process includes continuously producing a chip having a microstructure by engaging a solid body with a cutting edge of a cutting member while the solid body and the cutting edge move relative to each other. Simultaneously with the production of the chip, the chip is extruded in the immediate vicinity of the cutting edge and is separated from the solid body, the extruding step being performed at least in part by a constraining member that defines an opening with the cutting edge through which the chip passes and is plastically deformed to produce the extruded chip. It is further required that the spacing between an edge of the cutting member and an edge of the constraining member is such that the chip thickness is less than or equal to minimum thickness of a chip produced without using the constraining member. Further, the chip has a cross-sectional shape having two orthogonal dimensions comprising a thickness dimension determined by the cutting member and the constraining member and a width dimension orthogonal to the thickness dimension. This process results in the chip having a microstructure without substantial flow localization. These process steps result in the solid body becoming a machined component exhibiting surface with substantially lower heterogeneity in deformation and higher surface smoothness relative to surfaces of machined components produced by conventional machining.

The above process can be modified such that the spacing between an edge of the cutting member and an edge of the constraining member is such that the chip thickness is less than or equal to the average thickness ($h_{avg}$, as described above) of a chip produced without using the constraining member. This modification is also capable of suppressing flow localization in the chip.

In the above described processes, the size of the opening defined by the constraining member and the cutting edge through which the chip passes and is plastically deformed to produce the extruded chip produces a change in a deformation strain level induced in the chip and correspondingly on the surface of the workpiece being machined during the extruding step. A variation of the process described above is that the constraining member includes a die through which the chip is forced as a result of being continuously produced. It is to be further recognized that the cutting edge can be stationary and the solid body moves relative to the cutting edge during the continuous producing step. Further, in another embodiment of this disclosure, the solid body can rotate during the continuous producing and extruding steps.

In one embodiment of the disclosure, the continuous producing and extruding steps are performed by a linear machining operation. In another embodiment of the disclosure the extruding step induces a change in only the width dimensions, while in yet another embodiment of the disclosure, the extruding step induces a change in each of the two orthogonal dimensions.

In one embodiment of the invention, the extruded chip can have a round cross sectional shape where as in another embodiment of the disclosure, the extruded chip can have rectilinear cross-sectional shape.

It is to be further recognized that extruded chips produced using the methods and principles described in this disclosure can be subjected to a variety of treatments such as but not limited to thermal treatments, mechanical treatments, and thermo-mechanical treatments.

It is also to be further recognized that machined components produced using the methods and principles described in this disclosure can be subjected to a variety of treatments such as but not limited to thermal treatments, mechanical treatments, and thermo-mechanical treatments.

It should be noted that the solid body from which the machined component results using the processes and principles described in this disclosure can be formed of a material chosen from the group consisting of metallic, intermetallic, composites, and ceramic materials.

In another embodiment of the disclosure, further additive processing can be performed on the extruded chip to produce a final product. In yet another embodiment of the disclosure, the extruded chip can be separated from the chip and then the extruded chip can be placed in a matrix material to form a final product in which the extruded chip is a reinforcement material for the matrix material.

It is to be noted that the process and principles described in this disclosure are applicable to many classes of materials such as but not limited to metallic, intermetallic, composites, and ceramic materials such that the extruded chip is entirely formed of the chosen material.

It should be recognized that the above machining process with a constraint wherein the constraint location is chosen based on criteria described above and principles thereof are applicable to produce nanostructured chips and result in nanostructured extruded chip.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A process of producing a machined component from a material, the process comprising the steps of:
    conducting a first machining operation without a constraining member to produce a first chip from a solid body of the material and to form a first machined surface on the material by providing relative motion between the material and a cutting edge of a cutting member, the first machining operation causing flow localization that creates a serrated flow pattern within the first chip;
    microscopically examining the first chip to detect the serrated flow pattern and measure by optical microscopy a maximum chip thickness of the first chip within the serrated flow pattern and a minimum chip thickness of the first chip within the serrated flow pattern;

conducting a second machining operation with a constraining member to continuously produce a second chip from the solid body of the material and to form from the solid body the machined component having a second machined surface on the material by providing relative motion between the material and the cutting edge of the cutting member;

simultaneously extruding the second chip in the immediate vicinity of the cutting edge and as the second chip is separated from the material by the cutting edge to continuously plastically deform the second chip and produce an extruded chip, the extruding step being performed at least in part by the constraining member that defines an opening with the cutting edge of the cutting member and through which the second chip passes and is plastically deformed to produce the extruded chip, a spacing being defined between an edge of the constraining member and the cutting edge of the cutting member;

wherein the second machining operation comprises adjusting the spacing between the cutting edge of the cutting member and the edge of the constraining member such that the extruded chip has an extruded chip thickness that is less than or equal to the minimum chip thickness of the first chip; and wherein the extruded chip has a cross-sectional shape having two orthogonal dimensions comprising a thickness dimension determined by the extruded chip thickness and a width dimension orthogonal to the thickness dimension, the extruded chip having a microstructure in which flow localization in the extruded chip is suppressed to a level relative to the flow localization caused by the first machining operation so as to result in the second machined surface of the machined component formed by the second machining operation exhibiting lower heterogeneity in deformation and higher surface smoothness relative to the first machined surface formed on the material by the first machining operation.

2. The process according to claim 1, wherein the second chip is continuously produced to have a nanostructured microstructure and the microstructure of the extruded chip is nanostructured.

3. The process according to claim 1, wherein the constraining member comprises a die through which the second chip is forced as a result of being continuously produced.

4. The process according to claim 1, wherein the cutting edge is stationary and the material moves relative to the cutting edge during the continuous producing step.

5. The process according to claim 1, wherein the material rotates during the continuous producing and extruding steps.

6. The process according to claim 1, wherein the material is stationary and the cutting edge moves relative to the material during the continuous producing step.

7. The process according to claim 1, wherein the extruding step induces a change in each of the two orthogonal dimensions.

8. The process according to claim 1, wherein the extruded chip has a round or rectilinear cross-sectional shape.

9. The process according to claim 1, wherein the serrated flow pattern comprises shear banding in the first chip.

10. The process according to claim 9, wherein the material is a low thermal diffusivity metal alloy.

11. The process according to claim 1, wherein the serrated flow pattern comprises segmentation in the first chip.

12. The process according to claim 11, wherein the material is a partially hardened metal alloy.

13. The process according to claim 1, wherein the material is an annealed metal alloy.

14. The process according to claim 1, wherein the material is chosen from the group consisting of metallic, intermetallic, composites, and ceramic materials, such that the extruded chip is entirely formed of the material.

15. The machined component produced by the process of claim 1 and having the second machined surface on the material.

16. The process according to claim 1, further comprising performing on the machined component at least one treatment chosen from the group consisting of thermal treatments, mechanical treatments, and thermo-mechanical treatments.

17. A process of producing a machined component from a material, the process comprising the steps of:

conducting a first machining operation without a constraining member to produce a first chip from a solid body of the material and to form a first machined surface on the material by providing relative motion between the material and a cutting edge of a cutting member, the first machining operation causing flow localization that creates a serrated flow pattern within the first chip;

microscopically examining the first chip to detect the serrated flow pattern and measure by optical microscopy a maximum chip thickness of the first chip within the serrated flow pattern and a minimum chip thickness of the first chip within the serrated flow pattern;

determining an average chip thickness of the first chip;

conducting a second machining operation with a constraining member to continuously produce a second chip from the solid body of the material and to form from the solid body the machined component having a second machined surface on the material by providing relative motion between the material and the cutting edge of the cutting member; and simultaneously extruding the second chip in the immediate vicinity of the cutting edge and as the second chip is separated from the material by the cutting edge to continuously plastically deform the second chip and produce an extruded chip, the extruding step being performed at least in part by the constraining member that defines an opening with the cutting edge of the cutting member and through which the second chip passes and is plastically deformed to produce the extruded chip, a spacing being defined between an edge of the constraining member and the cutting edge of the cutting member;

wherein the second machining operation comprises adjusting the spacing between the cutting edge of the cutting member and the edge of the constraining member such that the extruded chip has an extruded chip thickness that is less than or equal to the average chip thickness of the first chip; and wherein the extruded chip has a cross-sectional shape having two orthogonal dimensions comprising a thickness dimension determined by the extruded chip thickness and a width dimension orthogonal to the thickness dimension, the extruded chip having a microstructure in which flow localization in the extruded chip is suppressed to a level relative to the flow localization caused by the first machining operation so as to result in the second machined surface of the machined component formed by the second machining operation exhibiting lower heterogeneity in deformation and higher surface smoothness relative to the first machined surface formed on the material by the first machining operation.

18. The machined component produced by the process of claim 17 and having the second machined surface on the material.

19. The process according to claim 17, further comprising performing on the machined component at least one treatment chosen from the group consisting of thermal treatments, mechanical treatments, and thermo-mechanical treatments.

20. The process according to claim 17, wherein the serrated flow pattern within the first chip comprises segmentation or shear banding.

* * * * *